(No Model.) 2 Sheets—Sheet 2.

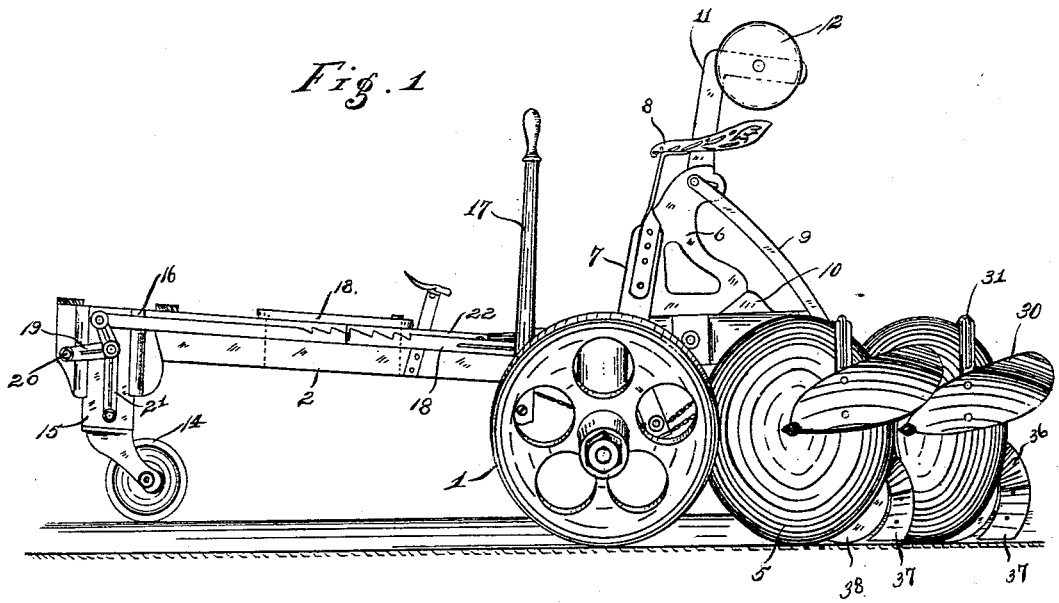

L. D. RAILSBACK.
ROTARY PLOW.

No. 555,331. Patented Feb. 25, 1896.

Witnesses
A. S. Cartright.
Lela Monroe

Inventor
Lafayette D. Railsback
By Attorney V. H. Lockwood

UNITED STATES PATENT OFFICE.

LAFAYETTE D. RAILSBACK, OF INDIANAPOLIS, INDIANA.

ROTARY PLOW.

SPECIFICATION forming part of Letters Patent No. 555,331, dated February 25, 1896.

Application filed October 15, 1894. Serial No. 525,880. (No model.)

*To all whom it may concern:*

Be it known that I, LAFAYETTE D. RAILSBACK, of Indianapolis, county of Marion, and State of Indiana, have invented certain new and useful Improvements in Rotary Plows; and I do hereby declare that the following is a full, clear, and exact description thereof, reference being had to the accompanying drawings, in which like figures refer to like parts.

My invention relates to certain improvements in rotary-disk plows whereby they are enabled to do better work and be more easily managed and adjusted than similar plows heretofore.

One difficulty with rotary plows heretofore has been their inability to turn sod well. The disks would not turn the sod far enough over, but leave it standing on edge or in such a position that it would fall back partly with the sod upward. Farmers have considered this a serious objection, and one object of my invention is to overcome that.

Another object of my invention is to enable me to more completely throw the weight of the wheels and plow-frame on the disks.

A third feature consists of an improvement in my chain device whereby I utilize the draft in combination with the weight of the wheels and plow-frame to force and keep the disks in the ground, and a fourth feature relates to means for adjusting the angle at which the disks cut.

The various features of my invention will more fully appear from the drawings and description following.

Figure 4:
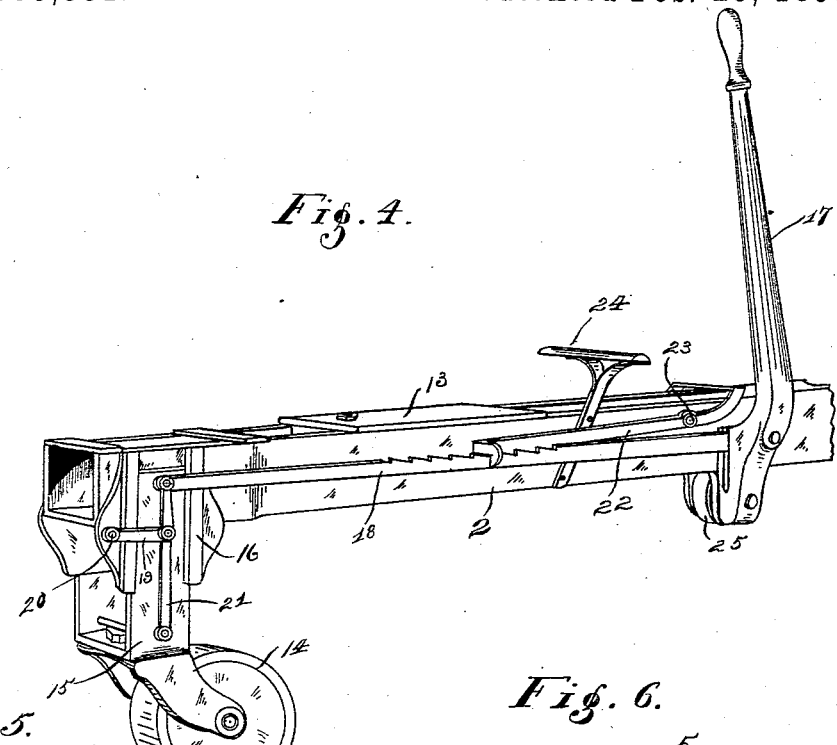
Figure 5:
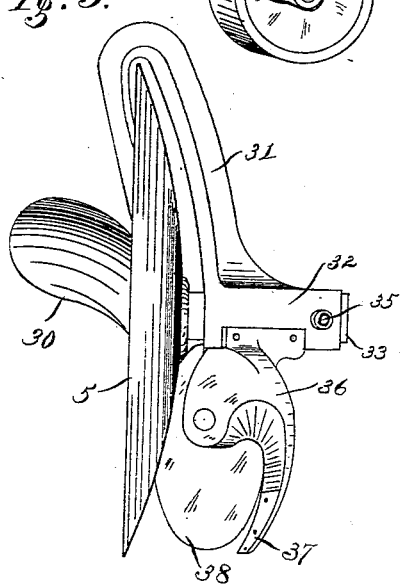
Figure 6:
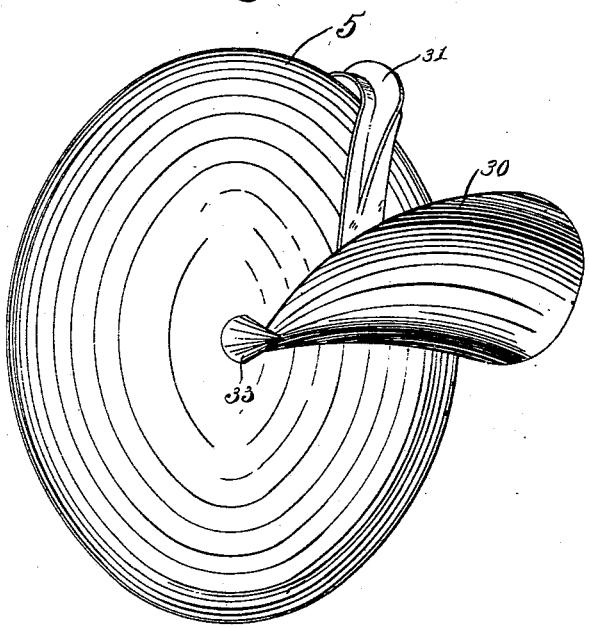

Figure 1 is a side elevation of my plow on the furrow side thereof. Fig. 2 is a longitudinal section of a part of the plow, illustrating the draft-chain attachment. Fig. 3 is a plan view of the disk and its mounting, its beam being broken away. Fig. 4 is a perspective of the front part of my plow, including the tongue-beam and caster-wheel. Fig. 5 is a rear view in perspective of a disk and its attachments, while Fig. 6 is a side view in perspective of the same.

Between the land and the furrow wheel 1 extends a suitable axle secured to the frame or framework of my plow, substantially the same construction as that shown in my former Letters Patent, numbered 528,511, dated October 30, 1894.

The tongue-beam 2 is rigidly connected at its rear end to the framework or forms a part of the framework of the plow. To the rear end of the tongue-beam 2 or to the framework is pivoted at its front end a disk-beam 3 provided at its rear with two arms 4, on which dish-shaped disks 5 are mounted.

6 is a lever pivoted between its ends to the vertical standard 7, on which the seat 8 is secured and provided with bars 9 and a lug 10 secured to the disk-beam. A hand-lever 11 extends above, carrying a weight 12. This construction is the same as shown and described in my former Letters Patent, numbered 528,511, dated October 30, 1894.

It will be observed that the lever 6 is of such character as to tend to hold the disk-beam down and make a rigid connection between the disk-beam and the tongue or front beam. The tongue-beam 2 is constructed so as to have an ordinary tongue readily inserted in it, and 13 is a doubletree-block which slides backward and forward in this tongue-beam. The front part of the tongue-beam 2 is supported by a caster-wheel 14 mounted on the lower end of the frame 15 provided with two jaws sliding vertically between guideways 16 in the front end of the tongue-beam. By this means the weight of the tongue is taken off of the shoulders of the horses.

In order to throw the whole weight of the wheels and plow-frame upon the disks, I provide a hand-lever pivoted at its lower end to the framework. Above its pivotal point is pivoted a rack-bar 18 or link provided with teeth on its upper side extending forward and pivoted at its front end to the bell-crank 19. The other end of the bell-crank is pivoted to the front end of the tongue-beam 2 at 20, and it is centrally pivoted to a link 21 whose lower end is pivoted to the vertically-moving frame 15, in which the caster-wheel 14 is mounted. 22 is a latch pivoted to the tongue-beam at 23 and having its rear end formed so that the person riding on the plow can release the latch with his foot. 24 is a stationary foot-rest. By this construction the front end of the tongue-beam 2 can be raised or lowered while the plow is in operation. When it is raised and the connection between the plow-frame and disk-beam is rigid the result is that the whole weight of the wheels and plow-frame is thrown upon the disks. This is an exceedingly useful and helpful device in plowing hard ground or running over a hard spot in the ground or where there is a tendency of the disks to run out by reason of the weeds or any other cause. The pressure upon the disks can be nicely adjusted while the plow is in operation.

To the sliding doubletree-block 13 is attached a chain 24 running back over a pulley 25 in the tongue-beam 2, under a pulley 26 mounted in a slot in the rearwardly-curved lower end of the vertical beam 7, forming a part of the framework, and back over the pulley 27 mounted in the bracket 28 secured near the rear of the disk-beam 3 and returning secured at 29 to the lower end of the vertical beam or bar 7. This construction is intended to be an improvement over what is shown in my former Letters Patent numbered 528,511, dated October 30, 1894, whereby the draft of the beam is utilized in combination with the weight of the plow-frame and wheels to draw the disks down into the ground and keep them there while at work. I think that the construction herein doubles the downward draft or pull on the disks.

An important feature of my plow consists in the sod-turners 30, which are carried on the curved arm or support 31 that extends from and is secured to or integral with the boxing 32. This arm 31 extends over the disks so as not to contact with them and carries the sod-turners 30. This sod-turner is preferably made in the shape substantially shown in Figs. 5 and 6 with the point extending from behind the conical end of the axle 33 on which the disk is mounted. This conical-headed bolt prevents the dirt and weeds from getting under or behind the point of the sod-turner. From that point the sod-turner is curved gradually backward and outward, as shown in Fig. 5, and is also curved in the other direction upward and outward. Its object is to take the sod after it leaves the plow-disk and turn it somewhat farther, so as to leave it upside down. This device not only will thus turn sod completely, but will also turn and cover weeds. It should be so constructed that it could be readily detached if desired, as in certain kinds of ground it would be needless, but in sod it enables the rotary plow to do what it has never yet been able to do as far as I am aware.

The arbor or axle 33, on which the disk is mounted, is secured in the housing 34, as shown in Fig. 3, the housing at the opposite end of the arbor or axle having in each side set-screws 35, which co-operate with each other to change the angle of the arbor 33 and thereby the angle of the rotary disk, so as to make it cut more or less, or otherwise adjust the direction of its movement, as may be desired. To the lower end of the housing or bearing is secured a casting 36 having at its lower end a scraper or furrow-cleaner 37 and mounted in front thereof a rotary cutter 38. This construction is to clean out and square the angle of the furrow to permit the land-wheel to run accurately and to avoid side draft of the plow. It is substantially the same as what is shown in my former Letters Patent, numbered 528,511, dated October 30, 1894.

What I claim as my invention, and desire to secure by Letters Patent, is—

1. In a rotary plow provided with means for rendering the beam rigid, the combination of a sliding frame secured to the front end of such beam, a wheel mounted at the lower end of such sliding frame and adapted to support the front end of such beam, a bell-crank lever suitably pivoted to the front end of such beam and to such sliding frame, a hand-lever mounted on the main beam near the plow-seat, a link extending from such bell-crank to the hand-lever, and a suitable latch adapted to lock such mechanism in a certain position, substantially as shown and described.

2. In a rotary plow, a plow-disk provided with a stub-axle, a beam having a housing in which such axle is mounted, the bore of such housing being substantially of the same width horizontally as the axle at the end nearest the disk and wider than the axle at the end farthest from the disk, and set-screws extending through the housing on each side at the end farthest from the disk whereby the angle of the axle and disk may be adjusted, substantially as shown and described.

3. In a rotary plow, the combination with the main wheels and axle, of a vertical beam, a tongue-beam secured to such vertical beam, a disk-beam pivoted behind such vertical beam, and a draft-chain secured at one end to the stationary part of the plow and passing around a pulley on the disk-beam, under a pulley on the vertical beam, and attached to the draft by suitable means, substantially as shown and described.

4. In a rotary plow, the combination with the wheels and axle, of a vertical beam curved rearwardly somewhat at its lower end, a disk-beam pivoted behind such vertical beam, a tongue-beam secured to such vertical beam, a moving doubletree-block in such tongue-beam, a pulley under such tongue-beam, near the lower end of such vertical beam and under the rear end of such disk-beam, and a draft-chain secured to the lower end of the vertical beam, passing backward about the pulley on the disk-beam and forward under the pulley on the vertical beam, over the pulley on the tongue-beam to the doubletree-block, substantially as shown and described.

In witness whereof I have hereunto set my hand this 6th day of October, 1894.

LAFAYETTE D. RAILSBACK.

Witnesses:
V. H. LOCKWOOD,
GEO. C. CONNER.